Figure 1:
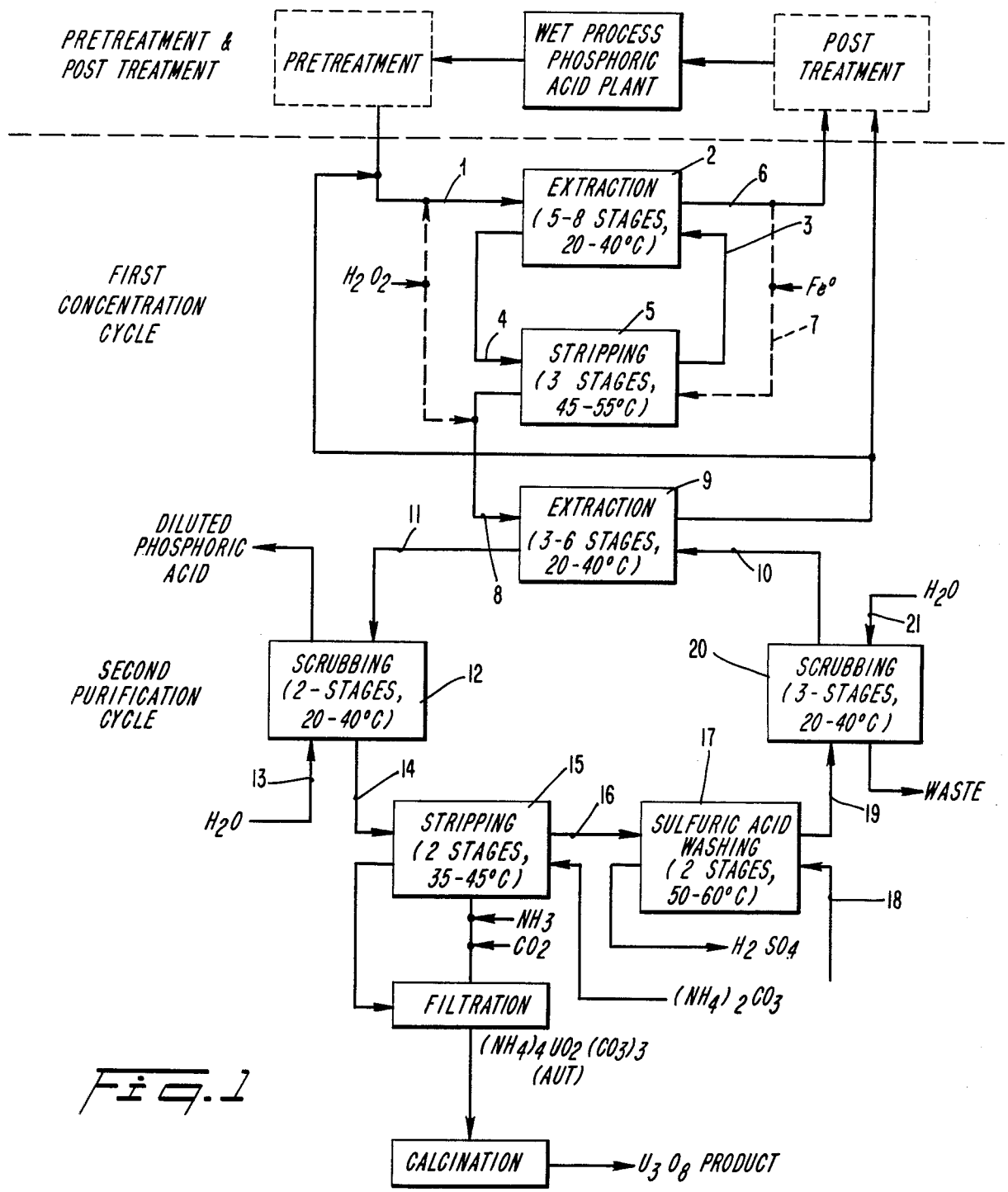

United States Patent [19]

TSAI et al.

[11] Patent Number: 4,544,530
[45] Date of Patent: Oct. 1, 1985

[54] SEPARATION PROCESS FOR THE RECOVERY OF URANIUM FROM WET-PROCESS PHOSPHORIC ACID

[75] Inventors: Ying-Ming Tsai, Taipei; Hsiao-Ming Chen, Taiwan; Gann Ting, Taipei, all of Taiwan

[73] Assignee: Institute of Nuclear Energy Research, Taiwan, Taiwan

[21] Appl. No.: 516,667

[22] Filed: Jul. 25, 1983

Related U.S. Application Data

[63] Continuation of Ser. No. 195,871, Oct. 10, 1980, abandoned.

[51] Int. Cl.[4] ............................................. C01G 43/00
[52] U.S. Cl. ...................................................... 423/10
[58] Field of Search ...................................... 423/8, 10

[56] References Cited

U.S. PATENT DOCUMENTS

| | | | |
|---|---|---|---|
| 2,859,094 | 11/1958 | Schmitt et al. | 423/10 |
| 3,052,514 | 9/1962 | Schmitt | 423/10 |
| 3,711,591 | 1/1973 | Hurst et al. | 423/10 |
| 4,207,294 | 7/1980 | Hirono | 423/10 |
| 4,238,457 | 12/1980 | Sialino et al. | 423/10 |
| 4,255,392 | 3/1981 | Chiang | 423/11 |
| 4,258,014 | 3/1981 | Pyrih et al. | 423/10 |
| 4,332,776 | 6/1982 | Stana | 423/9 |

OTHER PUBLICATIONS

Blake et al, "Synergistic Uranium Extractants: Combination of Neutral Organophosphorous Compounds with Dialkylphosphorus Acids", OXNL-2259, Oak Ridge National Lab, (1959).
Hurst et al, *Ind. Eng. Chem. Process Des. Develop.*, 11 (#1), pp. 122–128 (1972).

*Primary Examiner*—Edward A. Miller
*Attorney, Agent, or Firm*—Burns, Doane, Swecker & Mathis

[57] ABSTRACT

A synergistic extractant combination consisting of di(2-ethylhexyl) phosphoric acid (D2EHPA) and dibutyl butyl phosphonate (DBBP) in kerosene is employed in a two-cycle separation process for the recovery of uranium from wet-process phosphoric acid. The addition of the sulfuric acid and water scrubbing steps for the recycled extractant provides no disadvantages with respect to the comtamination and dilution by the ammonium ion and water to the phosphoric acid and also no precipitation occurs in the second cycle extraction step. The advantages of this process are lower chemical cost, higher product purity and better phase separation in comparison with the previous process.

5 Claims, 3 Drawing Figures

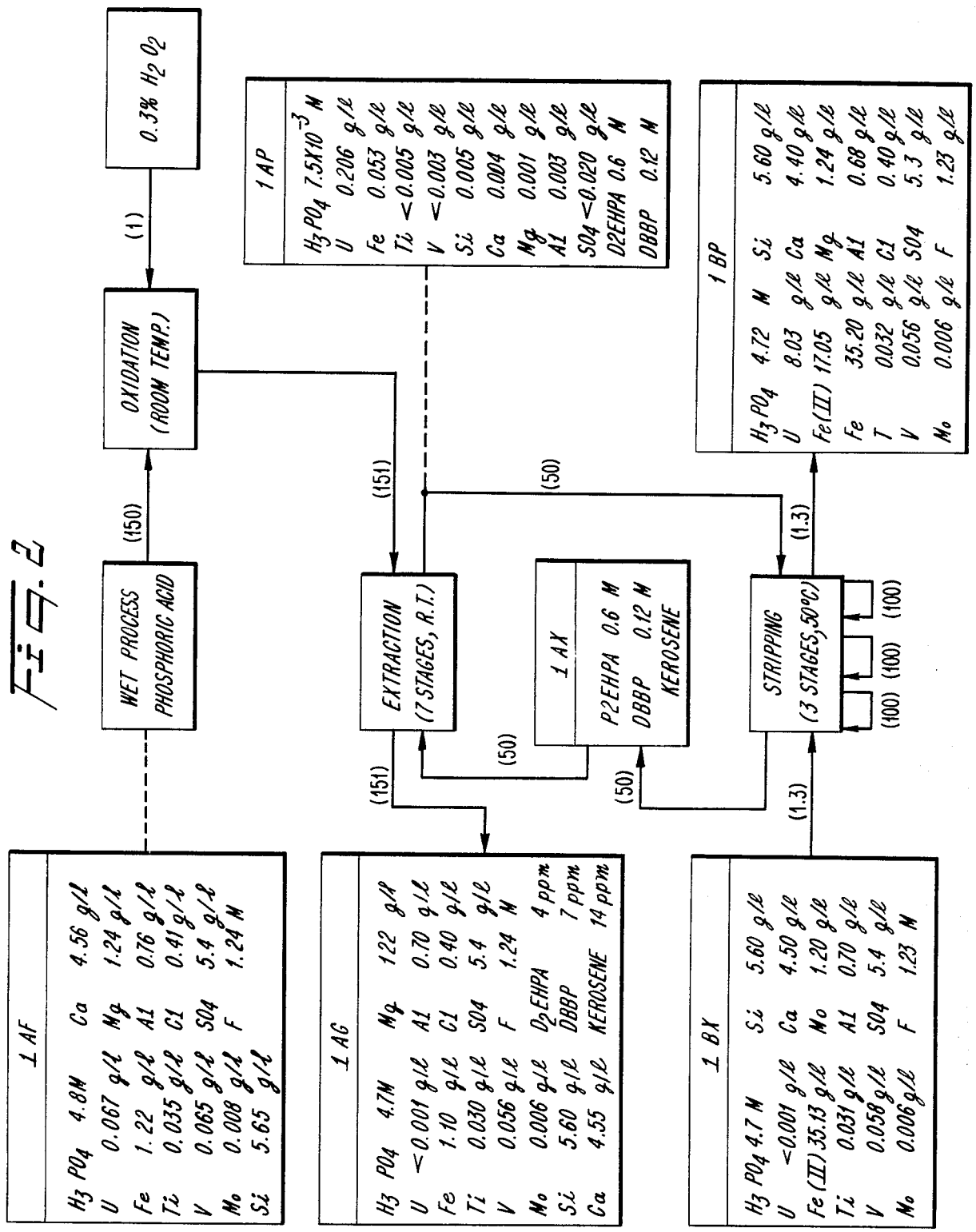

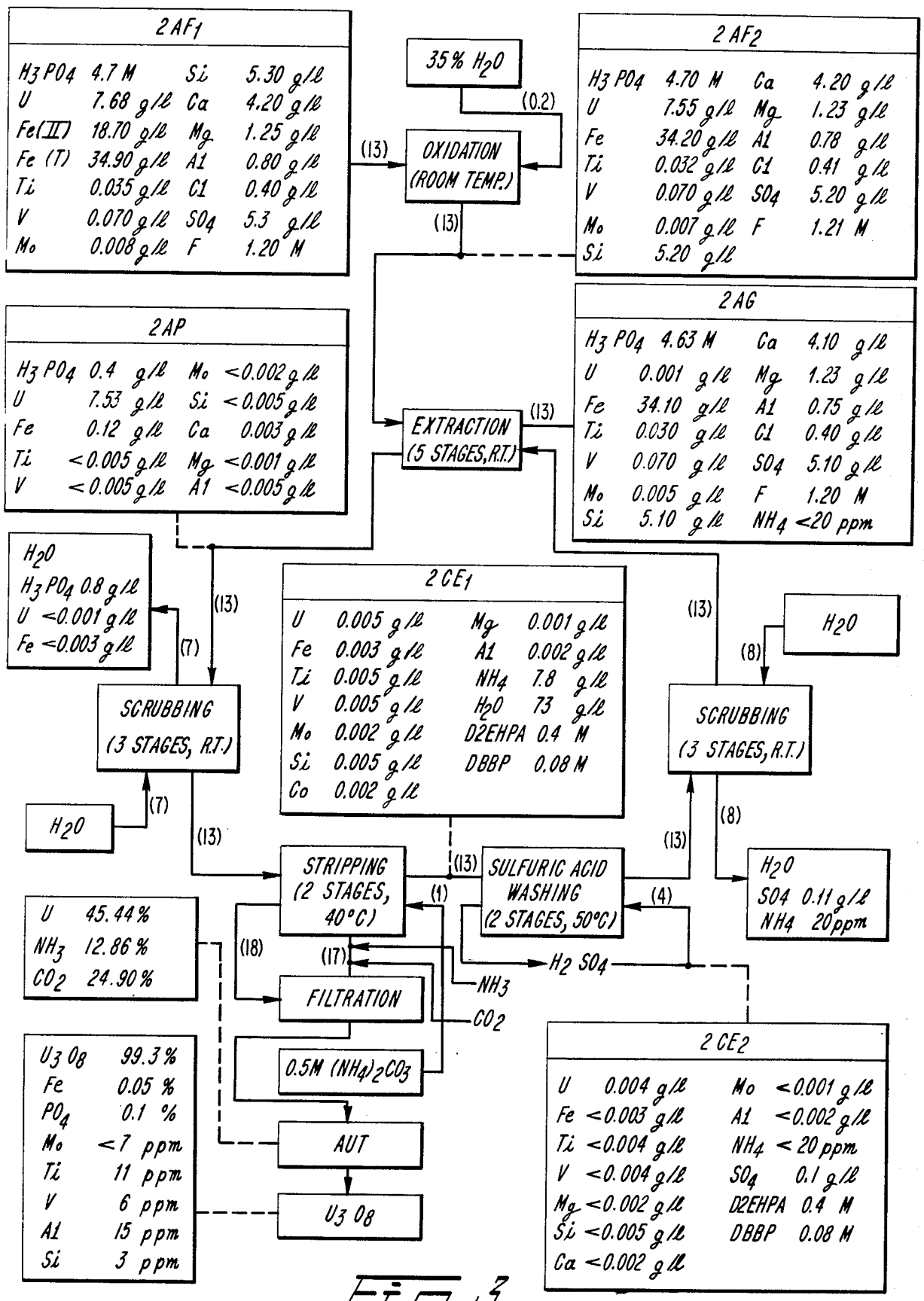

SEPARATION PROCESS FOR THE RECOVERY OF URANIUM FROM WET-PROCESS PHOSPHORIC ACID

This application is a continuation of application Ser. No. 195,871, filed Oct. 10, 1980, now abandoned.

BACKGROUND OF THE INVENTION

Wet-process phosphoric acid contains a significant amount of uranium, typically about 0.1 to 0.2 g/l. Apart from being economically favourable, the recovery of uranium as a by-product of phosphate fertilizer production supplies part of the world's nuclear fuel resource and reduces the environmental contamination. In order to recover the valuable source of uranium, a so-called "$D_2T$-$D_2T$ process" has been developed by a research team at the Oak Ridge National Laboratory in the United States to separate it from a phosphoric acid solution prior to further treatment to produce a fertilizer product. (See U.S. Pat. No. 3,711,591 by F. J. Hurst et al. titled "Reductive Stripping Process for the Recovery of Uranium from Wet-process Phosphoric Acid". Also, see the article in Ind. Eng. Chem. Process Des. Develop., 11, 122 (1972) by F. J. Hurst et al. titled "Recovery of Uranium from Wet-process Phosphoric Acid").

The $D_2T$-$D_2T$ process comprises two steps. A synergistic extractant combination consisting of di(2-ethylhexyl) phosphoric acid (D2EHPA) and trioctylphosphine oxide (TOPO) in kerosene is used in this process to extract uranium in the +6 oxidation state in the first step. In the second step of the process, the concentrated acidic aqueous stream is again oxidized and extracted with the same synergistic organic extractant, and finally stripped with ammonium carbonate solution to precipitate ammonium uranyl tricarbonate, $(NH_4)_4UO_2(CO_3)_3$, (AUT).

This process typically suffers from several disadvantages: (1) The TOPO synergistic agent is expensive and hence the total chemical reagent cost is higher. (2) In the second purification part of $D_2T$-$D_2T$ process, the use of ammonium carbonate as the stripping reagent results in the conversion of the D2EHPA to a highly hydrated ammonium salt,

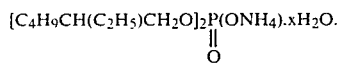

When the stripped solvent is recycled to the extraction step, the extracted water and $NH_4^+$ transfer to the aqueous phosphoric phase, dilute and contaminate the wet-process phosphoric acid, which is unacceptable to the phosphoric acid plant to produce feed stocks and various phosphate chemicals. These in turn have some other disadvantageous effects such as unclear phase separation, ammonium salt precipitation [$Fe_3NH_4H_8$-$(PO_4)_6.6H_2O$ etc.] and cause problems during operation.

SUMMARY OF THE INVENTION

The present invention relates to a two-cycle separation process for the recovery of uranium from wet-process phosphoric acid. A synergistic combination of di(2-ethylhexyl) phosphoric acid (D2EHPA) and dibutyl butyl phosphonate

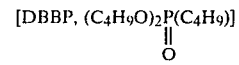

in kerosene is used as extractant. Laboratory experimental results indicate that the maximum uranium extraction occurs when the DBBP:D2EHPA mole ratio is 1:5 and this ratio has been used in the present invention. The concentration of D2EHPA is established based on the optimum conditions for uranium recovery and purification. The uranium in wet-process phosphoric acid is concentrated in the first cycle through extraction and reductive stripping operations, then the uranium-concentrated acid passes to the second purification cycle, where its uranium is extracted, scrubbed with water and stripped with ammonium carbonate solution as ammonium uranyl tricarbonate. Before recycling the solvent to the extraction step, the stripped solvent is scrubbed with sulfuric acid solution and water to remove the $NH_4^+$ and water of the hydrated ammonium salt of D2EHPA. More than 99% of $NH_4^+$ and the hydrated water can be removed when the concentration of $H^+$ in the scrubbing sulfuric acid solution is above 0.6N. This process offers the advantages of good phase separation, no problems concerning the contamination of $NH_4^+$ and dilution with water to the phosphoric acid, and no precipitation of ammonium salt is observed. Also, this D2EHPA-DBBP process is more economically favourable because of the lower reagent cost for DBBP and higher purity of the product.

DESCRIPTION OF THE INVENTION

The invention will be described in detail with reference to FIG. 1 which is a schematic diagram illustrating the process of the present invention.

FIGS. 2 and 3 are material balance diagrams for the first and second cycles, respectively.

FIRST CONCENTRATION CYCLE

After pretreatment for removing suspended solid and organic matter from wet-process phosphoric acid, the uranium in the feed acid is oxidized to the +6 oxidation state by adding a suitable amount of $H_2O_2$, which is dependent on the EMF or $Fe^{2+}$ concentration in the feed acid, sometimes this step is even unnecessary. Referring to FIG. 1, feed acid from line 1 enters the extraction section 2 (5 to 8 stages). In the extraction section, the feed acid is countercurrently mixed and settled with the organic extractant from line 3 which reacts with the uranyl ions to form a complex soluble in the solvent. The composition of the feed acid varies with different batches, it generally ranges from 4 to 6M in $H_3PO_4$ and contains 60 to 120 parts per million (ppm) by weight of uranium. The organic extractant used in this invention consists essentially of di(2-ethylhexyl) phosphoric acid (D2EHPA) and dibutyl butyl phosphonate (DBBP) dissolved in kerosene. In the first cycle said organic extractant is 0.5~0.7M D2EHPA-0.1~0.14M DBBP-kerosene (The optimum D2EHPA:DBBP mole ratio is 5:1). The ratio of the feed acid to organic extractant can be adjusted from 2:1 to 4:1 which is dependent on the phosphoric acid concentration and uranium concentration of the aqueous phase. The uranium extraction coefficients decrease as the temperature of the acid is increased. The operation temperature in the extraction section is better kept under room temperature. The organic extractant, containing complexed uranium, passes through line 4 to the reductive stripping section 5. To a portion of the raffinate from the extraction section 2 is added scrap iron (Fe°) to reduce ferric ions and to bring the ferrous ion concentration up to 25 to 50 grams per liter and passes through lines 6 and 7 to mix with the organic extractant. The uranyl ion is reduced to the quadravalent $U^{4+}$ ion and therefore stripped to the aqueous stream due to the fact that the $U^{4+}$ ion is not complexed by D2EHPA-DBBP. The volumetric flow ratios of the uranium-loaded organic extractant stream 4 to strip liquor stream 7 is 35/1 to 50/1. Intrastage recycle of the aqueous phase from the settlers to the mixers is provided to provide an aqueous/organic phase ratio of about 2 in the mixers-settlers and an operation temperature of 45°~55° C. to ensure efficient mixing and stripping of the uranium. The organic extractant leaving the reductive stripping section is then recycled through line 3 to extraction section 2. The product solution from the first concentration cycle contains about 6 to 15 g/l uranium and about 25 to 50 g/l iron.

Second Purification Cycle

The quadravalent $U^{4+}$ ion in the first cycle product solution is oxidized by $H_2O_2$ to the uranyl ion before entering extraction section 9 (3 to 6 stages) through line 8. The amount of oxidant added is dependent upon the $Fe^{2+}$ concentration in the acid. In the extraction section, the oxidized acid is contacted with the organic extractant from line 10 containing 0.3~0.5M D2EHPA-0.06~0.1M DBBP-kerosene. The volumetric flow ratio of aqueous phase to organic phase is about 1 and the concentration of the organic extractant is lower than that used in the first cycle. The main purpose is to obtain a high purity product by increasing the saturation capacity of the extractant for uranium and minimizing the extraction of impurities. The operation temperature of the extraction section is preferably kept at room temperature. More than 99% of the uranium is extracted into the organic phase. In addition to uranium, the extract contains 0.5~1.5 g/l phosphate and 0.10~0.20 g/l iron. Organic phase from line 11 and water from line 13 enter three-stage water scrubbing section. More than 98% of the phosphate in the organic phase is removed under operation at an organic/aqueous ratio of 2/1 to 5/1. The uranium-loaded organic extractant stream 14 then enters the ammonium carbonate stripping section 15. Almost all of the uranium is removed from the organic phase with ammonium carbonate solution in two stages. Make-up ammonia and carbon dioxide are bubbled into the aqueous phase of the settler in the first stage to maintain the concentration of ammonium carbonate at about 2 to 2.5 M. Dilute ammonium carbonate solution of about 0.5 M is fed at a slow flow rate to the second stripping stage to scrub the very small amount of entrained uranium from the organic phase and to compensate for the loss of water from the stripping system, which occurs on conversion of the D2EHPA to the hydrated ammonium salt. Calcination of the AUT precipitate for two hours at 500°~800° C. yields a product containing more than 99% of $U_3O_8$.

The stripped organic extractant leaving the ammonium carbonate stripping section 15 contains 7.2~8.3 g/l $NH_4^+$ and 65~80 g/l $H_2O$. The $NH_4^+$ and $H_2O$ in the organic phase are scrubbed with the sulfuric solution from line 18 at an organic/aqueous ratio of 2/1 to 5/1. The concentration of the feed sulfuric acid solution in the two-stage scrubbing section is preferably 6N to 16 N. The sulfuric acid solution leaving the second scrubbing stage is recycled to the first stage. The scrubbing efficiency is less than 99% when the $H^+$ concentration of the recycled sulfuric acid solution gradually decreases to below 0.6N. The sulfuric acid scrubbing section should be designed so that it can be by-passed and replaced with fresh solution when necessary. Operating temperatures of 50°~60° C. are preferred for efficient phase separation. After sulfuric acid scrubbing, organic extractant contains about 100 ppm of $SO_4^{2-}$. The concentration of $SO_4^{2-}$ is reduced to below 10 ppm when scrubbed with water from line 21. No precipitate is found in the extraction section when the recycled organic extractant is scrubbed with sulfuric acid solution and water. Also, phase separation is improved in the second cycle extraction step, dilution and contamination of the wet-process phosphoric acid are prevented. As described above, the present process for the recovery of uranium from wet-process phosphoric acid has the following advantages:

1. The organic extractant used in this process consists of di(2-ethylhexyl) phosphoric acid and dibutyl butyl phosphonate in kerosene. The chemical reagent cost is lower for dibutyl butyl phosphonate than trioctyl phosphine oxide that is usually employed in the uranium recovery process.

2. The uranium in the first cycle can be suitably concentrated to the desired concentration by altering the concentration of the extractant and volumetric flow ratio of the two phases according to the uranium content of the feed acid.

3. In the second purification cycle of this invention, two stages of sulfuric acid scrubbing and three stages of water scrubbing are employed to remove the $NH_4^{30}$ and $H_2O$ in the organic extractant. No precipitate such as $Fe_3HN_3H_8(PO_4)_6.6H_2O$ is found, problems of phase separation, contamination and dilution of wet-process phosphoric acid are eliminated. The problem of $NH_4^+$ contamination of phosphoric acid is especially important for the phosphoric acid plant to produce feed stocks and various phosphate chemicals.

4. In the sulfuric acid scrubbing unit, the concentration of the feed acid solution is 6 to 16 N. Because sulfuric acid solution is recycled between the two stages, it is easier to deal with the less amount of the resulting liquid waste.

5. Synergistic extraction combination of D2EHPA and DBBP gives a poor iron extraction coefficient than D2EHPA-TOPO does, the purity of the final product in the present invention increases to about 99% and the iron content reduces to 0.05~0.10%.

The following example further illustrates this invention.

EXAMPLE

First Concentration Cycle

A test run was performed with wet-process phosphoric acid sample obtained from a local commercial phosphate plant. This acid sample was 4.8 M in $H_3PO_4$ and contained 0.067 grams of uranium per liter, its composition after pretreatment is shown in FIG. 2 (1AF). Uranium was converted to the hexavalent form $(UO_2^{2+})$ by adding suitable amount of 0.3% of $H_2O_2$ on a batch basis before extraction with 0.6 M D2EHPA-0.12M DBBP-kerosene. 98% of the uranium was extracted in seven extraction stages operated under room temperature at an organic/aqueous ratio of ⅓. The equilibrium composition of the organic phase is shown in FIG. 2 (1AP). The composition of the uranium-barren acid after post-treatment is shown in FIG. 2 (1AG), total organic contents in the raffinate is less than 50 ppm (DBBP~7 ppm). Uranium was stripped by contacting the uranium-loaded organic stream with a small volume of extracted raffinate in which scrap iron was added to produce about 35 grams of ferrous iron per liter. In the three-stage stripping section the volumetric flow ratio of organic phase to aqueous phase was 50/1.3 and intrastage recycle of the aqueous phase from the settlers to the mixers was provided to give an aqueous/organic phase ratio of about 2 in the mixers-settlers. The composition of the strip product solution is shown in FIG. 2 (1BP). Strip solution containing about 8 grams of uranium per liter is about a factor of 120 times of concentration in uranium than the original feed acid.

Second Purification Cycle

The first-cycle product solutions from several test runs were mixed for the continuous demonstrations of the second-cycle purification process. The composition of the mixed solution is shown in FIG. 3 ($2AF_1$). The uranium in the solution was oxidized with 35% $H_2O_2$ to the hexavalent state ($UO_2^{2+}$) and then extracted in five stages with 0.4M D2EHPA-0.08M DBBP-kerosene at an organic/aqueous flow ratio of 1/1. The composition of the extract is shown in FIG. 3 (2AP), more than 99% of the uranium was extracted. Almost all of the phosphate which was extracted into the organic phase was removed in three water scrubbing stages at room temperature. Then the uranium-loaded organic phase was stripped with ammonium carbonate solution to precipitate ammonium uranyl tricarbonate (AUT). The composition of the AUT is shown in FIG. 3, calcination of the air-dried precipitate for two hours at 600° C. yields a high-grade product which contains about 99.3% of $U_3O_8$. The composition of the organic extractant leaving the ammonium carbonate stripping section is shown in FIG. 3 ($2CE_1$), organic phase contains about 7.8 g/l $NH_4^+$ and 73 g/l $H_2O$. The composition of the stripped organic extractant after two stage sulfuric acid scrubbing unit is shown in FIG. 3 ($2CE_2$), more than 99% of the $NH_4^+$ and $H_2O$ were removed. The entrained $SO_4^{2-}$ in the organic phase due to with sulfuric acid solution was reduced to less than 5 ppm through three stages of water scrubbing under room temperature. After sulfuric acid and water scrubbing, the organic extractant was recycled to the extraction step. Good phase separation was observed and no $Fe_3NH_4H_8(PO_4)_6.6H_2O$ precipitate occurred. The recycled extractant was also free of ammonium ion and water during the continuous operation.

What is claimed is:

1. A separation process for the recovery of uranium having a purity of at least 99 percent from wet-process phosphoric acid comprising the steps of:
    (1) Extracting uranyl ion present in the acid oxidized by hydrogen peroxide with a synergistic extractant comprised of about 0.5–0.7M di(2-ethylhexyl)phosphoric acid and about 0.1–0.14M dibutyl butyl phosphonate in kerosene said di(2-ethylhexyl) phosphoric acid and dibutyl butyl phosphonate being present in a molar ratio of 5:1, respectively;
    (2) Concentrating the uranium by the reductive stripping of the uranium-loaded organic phase with a phosphoric acid strip solution containing a suitable amount of ferrous ion to provide a concentrated uranium solution;
    (3) Re-oxidizing and extracting said concentrated uranium solution with said synergistic extractant comprised of about 0.3–0.5M di(2-ethylhexyl)phosphoric acid and about 0.06–0.1M dibutyl butyl phosphonate in kerosene;
    (4) Scrubbing the uranium-loaded organic phase with water and stripping said organic solvent with an ammonium carbonate solution to precipitate the uranium as ammonium uranyl tricarbonate;
    (5) Scrubbing the stripped organic phase with sulfuric acid solution and water and recycling said organic phase to the second cycle extraction step.

2. The process according to claim 1 wherein the reductive strip solution contains from about 25–50 g/l of ferrous ion dissolved in a phosphoric acid solution of about 4–7M concentration at about 45°–55° C.

3. The process according to claim 1 wherein the concentration of said sulfuric acid feed solution in step (5) is about 6–16N.

4. The process according to claim 3 wherein the volume ratio of organic solvent to said sulfuric acid solution is about 2/1 to 5/1 and said scrubbing occurs at a temperature of about 50°–60° C.

5. The process according to claim 1 wherein the water scrubbing in step (5) is performed in 2 or 3 stages and preferably at room temperature with a volume ratio of organic solvent to water of about 1/1 to 1/5.

* * * * *